(12) United States Patent
Kalkunte et al.

(10) Patent No.: US 10,164,796 B2
(45) Date of Patent: Dec. 25, 2018

(54) FLEXIBLE FLOW TABLE WITH PROGRAMMABLE STATE MACHINE

(71) Applicant: BROADCOM CORPORATION, Irvine, CA (US)

(72) Inventors: Mohan Kalkunte, Saratoga, CA (US); Surendra Anubolu, Fremont, CA (US); Rochan Sankar, San Jose, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 234 days.

(21) Appl. No.: 15/155,137

(22) Filed: May 16, 2016

(65) Prior Publication Data

US 2017/0302477 A1    Oct. 19, 2017

Related U.S. Application Data

(60) Provisional application No. 62/324,421, filed on Apr. 19, 2016.

(51) Int. Cl.
H04L 12/26 (2006.01)
H04L 12/64 (2006.01)
H04L 29/06 (2006.01)
H04L 12/741 (2013.01)

(52) U.S. Cl.
CPC ........ *H04L 12/6418* (2013.01); *H04L 43/026* (2013.01); *H04L 43/04* (2013.01); *H04L 63/145* (2013.01); *H04L 63/1425* (2013.01); *H04L 69/165* (2013.01); *H04L 69/22* (2013.01); *H04L 45/745* (2013.01)

(58) Field of Classification Search
CPC ... H04L 12/6418; H04L 43/04; H04L 43/026; H04L 69/165; H04L 69/22; H04L 63/06; H04L 45/745
See application file for complete search history.

(56) References Cited

U.S. PATENT DOCUMENTS

| | | | |
|---|---|---|---|
| 9,806,895 B1* | 10/2017 | Kommula | H04L 12/1863 |
| 2005/0152335 A1* | 7/2005 | Lodha | H04L 45/38 370/351 |
| 2007/0110053 A1* | 5/2007 | Soni | H04L 63/0263 370/389 |
| 2009/0135834 A1* | 5/2009 | Guntur | H04L 47/10 370/400 |
| 2013/0311495 A1* | 11/2013 | Rossi | G06F 17/30495 707/758 |
| 2015/0350078 A1* | 12/2015 | Azgin | H04L 45/306 370/392 |
| 2016/0330301 A1* | 11/2016 | Raindel | H04L 67/327 |
| 2017/0317930 A1* | 11/2017 | Bianchi | H04L 45/745 |

* cited by examiner

*Primary Examiner* — Clemence S Han
(74) *Attorney, Agent, or Firm* — Garlick & Markison; Randy W. Lacasse

(57) ABSTRACT

A network switch for network communications includes an embedded programmable state machine to monitor data flows through the switch. The programmable state machine is configured to retain selectable states of selectable data packet fields. Programmable switch logic operative with the programmable state machine is configured to output one or more potential actions to be taken based on a selectable computation of detected selectable states. The programmable state machine can be implemented with either table lookups or flexible logic.

18 Claims, 5 Drawing Sheets

| Input \ Current State | State A | State B | State C |
|---|---|---|---|
| Input X | | | |
| Input Y | | C | |
| Input Z | | | |

FIG. 2

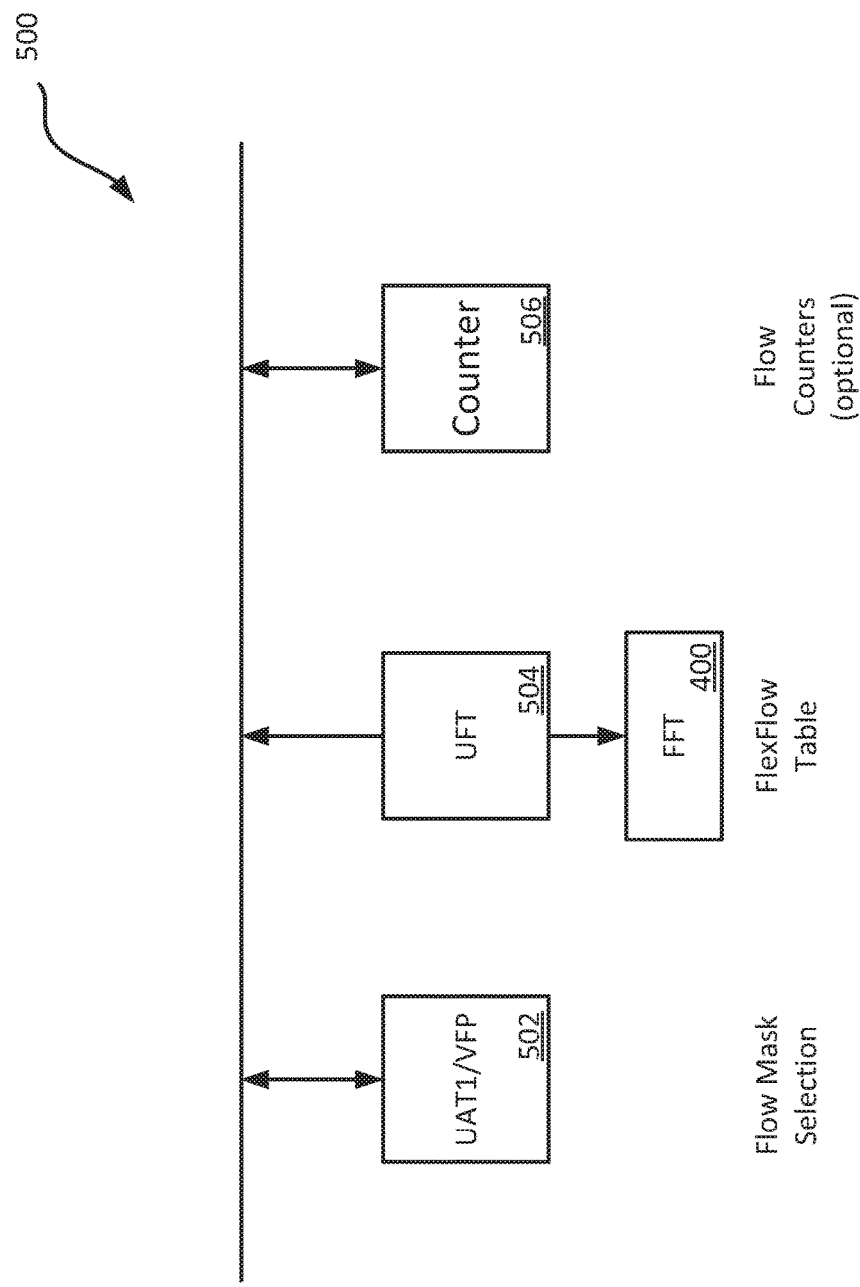

FLEXIBLE FLOW TABLE WITH PROGRAMMABLE STATE MACHINE

CROSS REFERENCE TO RELATED APPLICATIONS

The present U.S. Utility patent application claims priority pursuant to 35 U.S.C. § 119(e) to U.S. Provisional Application No. 62/324,421, entitled "FLEXIBLE FLOW TABLE WITH PROGRAMMABLE STATE MACHINE," filed Apr. 19, 2016, which is hereby incorporated herein by reference in its entirety and made part of the present U.S. Utility patent application for all purposes.

BACKGROUND

Technical Field

The present disclosure relates to a method and system for high speed data traffic monitoring. More specifically, it is related to data switching applications.

Description of Related Art

A state machine is a mathematical model of computation used to design both computer programs and sequential logic circuits. It is conceived as an abstract machine that can be in one of a finite number of states. The machine is in only one state at a time; the state it is in at any given time is called the current state. It can change from one state to another when initiated by a triggering event or condition; this is called a transition. A particular finite state machine (FSM) is defined by a list of its states, and a triggering condition for each transition.

Flow trackers for switching technology are often embodied as tracking static counters with a state that is predefined and set in hardwired logic. These flow trackers typically will count bytes and packets. Also, hardwired logic and state machines may be deployed with fixed functionality.

Disadvantages of conventional approaches will be evident to one skilled in the art when presented in the disclosure that follows.

BRIEF DESCRIPTION OF THE SEVERAL VIEWS OF THE DRAWING(S)

FIG. 2 illustrates an example state table in accordance with the present disclosure;

FIG. 5 illustrates the flexible flow table of FIG. 4 in an IP (Internet protocol) embodiment in accordance with the present disclosure.

DETAILED DESCRIPTION

Figure 1:
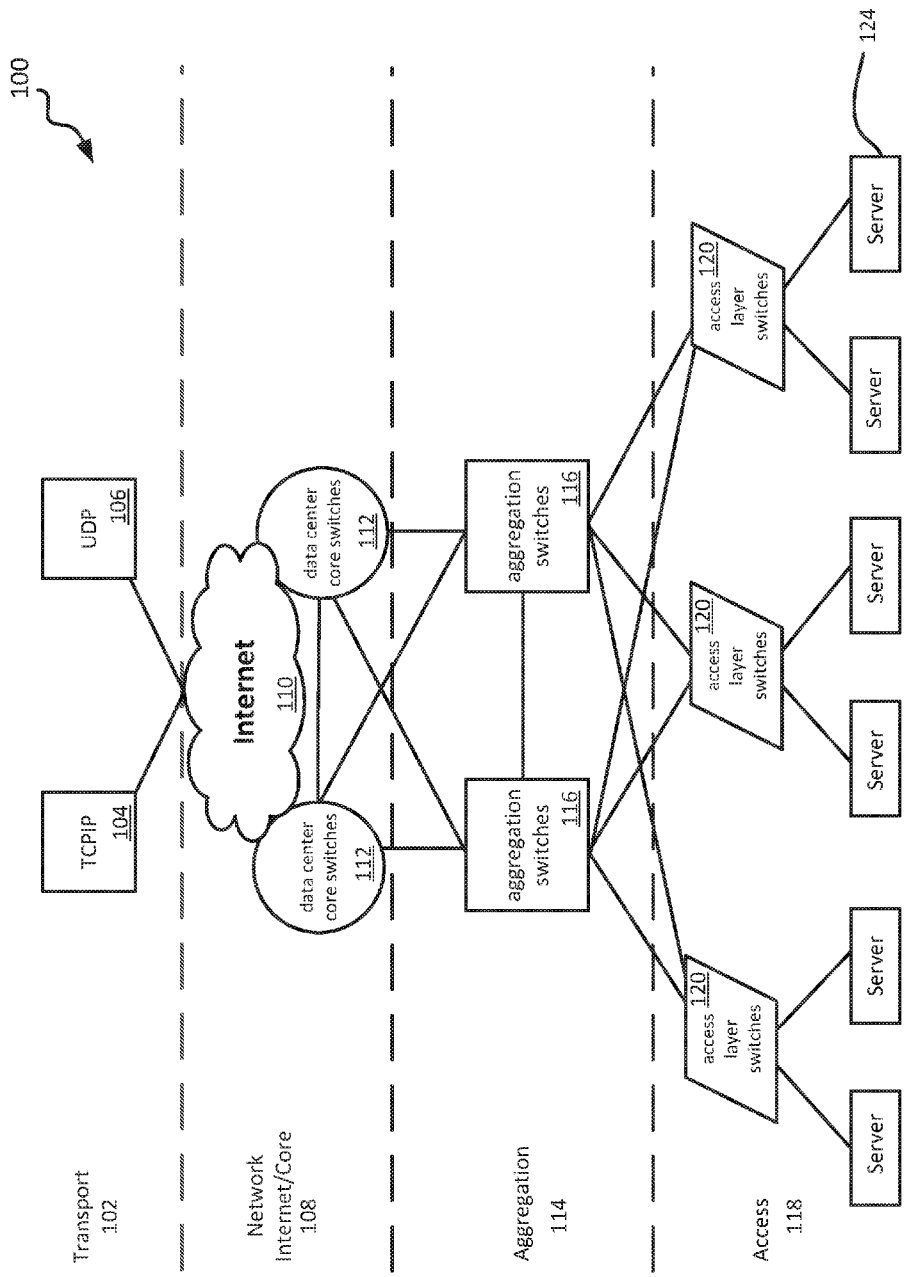
FIG. 1 illustrates a data center environment for practicing an embodiment of the present disclosure.

The embodiments of the present disclosure may be practiced in a variety of computing devices that operate in a wired or wireless environment or network. The examples described herein pertain to devices that can operate within a multi-terabyte specification and/or protocol. However, the embodiments of the present disclosure may be readily adapted to other protocols, speeds, data bandwidths, standards, programs, computer languages, etc.

Data that is being transmitted over a network is vulnerable to being intercepted by an unintended third party who could put the data to harmful use. Networks have become wide-spanning, crossing hundreds or thousands of miles which many rely on to access company information, and lost connectivity could cause business interruption.

Data centers house network connected client data. These network connections are vulnerable to unwanted access as they represent a weak point in the network that can make that information available to intruders. They can also provide an entry point for viruses and Trojan horses. One control is to have excellent network architecture and monitoring while switching traffic to an available path without loss of data or time. Information to assist in monitoring traffic flows include network utilization, determining safe workloads that can be added, recognizing applications or workloads that are congesting the network, determining if the network is under attack and what machines are likely compromised.

Switches, as they relate to computer networking and to Ethernet, are hardware-based devices which control the flow of data packets or cells based upon destination address information which is available in each packet. A properly designed and implemented switch should be capable of receiving a packet and switching the packet to an appropriate output port at the maximum speed capability of the particular network. Gigabit Ethernet is capable of transmitting data over a network at a rate of up to 1,000 megabits per second. Terabyte Ethernet transmits at a rate of up to 1 million megabits per second. Network switch devices can refer to any device that can transmit and receive data packets and thus participate in networked transmission. For example, network switch devices may include, but not be limited to: switches; hubs; routers; computers; servers; mobile devices; network interface cards (NICs) and the like.

Attacks on data centers are increasingly more sophisticated and may hide behind high speed data rates. Traditional monitoring methods, such as sampling packets, can miss infrequent events based on even high sampling rates. Near real time analysis is needed as, for example, an 8 Gbps stream uses 86 TB (terabytes) of data a day. In addition, real time monitoring may also include such capabilities as: visibility into applications (apps) and associated networks on which they reside, an ability to detect hotspots, troubleshooting the system, providing anomaly detection, malware detection or data mining.

In one embodiment, a data traffic switch, such as a multi-terabit switch, includes an embedded programmable state machine implementing a high speed flow tracking mechanism. The programmable state machine is flexible and can evolve to changing network instrumentation requirements. New applications can therefore be mapped to a flow table through an in-field upgrade or through customer-exposed programmability.

Some of the functions that, in the past, involved software for state keeping can now be done in hardware resulting in lower CPU utilization, orders of magnitude faster processing in the hardware and programmability that allows a switch ASIC (Application Specific Integrated Circuit) to adopt to evolving new use cases.

FIG. 1 illustrates a data center environment for practicing an embodiment of the present disclosure. For example, a data center environment 100 includes a series of communication layers (e.g., 102, 108, 114 and 118) for communicating and storing packetized data. While 4 layers are provided for illustration purposes, additional layers (e.g., 5-7) not shown, as well as other sublayers may be included in various configurations without departing from the scope of the present disclosure. In addition, the technology, as disclosed herein, can operate with less than the layers shown or single switch environments.

In an Open Systems Interconnection (OSI) communications model, a Transport layer ensures reliable arrival of messages and provides error checking mechanisms and data flow controls. Transport layer 102 provides services for both "connection-mode", such as TCP (transmission control protocol) data connections 104, and for "connectionless-mode" transmissions, such as UDP (user datagram protocol) 106. For connection-mode transmissions, a transmission may be sent or arrive in the form of packets that need to be reconstructed into a complete message at the other end. For both modes, the endpoints of communication are typically identified by port numbers such as TCP port 80 or UDP port 161.

A Network layer 108 (Internet/Core) provides addresses of neighboring nodes in the network, selection of routes and quality of service, as well as recognizing and forwarding to Transport layer 102 incoming messages for local host domains. A core layer for the data center consists primarily of sessions traveling between a network (e.g., Internet 110, WAN, LAN, Campus, etc.) and aggregation layer 114. The core aggregates the aggregation module traffic flows onto optimal paths to the core. A router is typically a core layer device, although data center core switches 112 can also perform core functions. The Internet Protocol (IP) address is a core address.

Aggregation layer 114 performs aggregation of sessions leaving and entering the data center and connects the core 108 to the access layer 118. Access layer 118, with access layer switches 120, provides switched access to storage/retrieval of stored packetized data within servers 124.

Any switches operative within or in connection (at the edge) to the data center or those making connections to the data center may include a processor, one or more sensors, memory, storage and a network interface. Computing devices may be operably coupled to network hardware (e.g., switches) via respective local area network (LAN) connections, WAN, Internet, cloud connected processing and storage. Network hardware, which may be a router, switch, bridge, modem, system controller, etc., may provide a wide area network (WAN) connection for a communication system. In addition, one or more of the shown devices may include circuitry and/or software which allow the particular device to communicate using the data center technology with each other or with proximal or remote devices.

FIG. 2 illustrates an example state table 200 in accordance with the present disclosure. A state transition table illustrates a combination of current state (e.g., State B) and input (e.g., Input Y) that provides the next state (e.g., State C). State transition tables are typically two-dimensional tables, but not restricted thereto. There are two common forms for arranging them. A vertical (or horizontal) dimension indicates current states, a horizontal (or vertical) dimension indicates events, and cells (row/column intersections) in the table contain the next state if an event happens (and possibly the action linked to this state transition). A state transition indicates what state (or states) a state machine will be moved to next, based on the current state and other inputs. Therefore, a state table is essentially a truth table in which some of the inputs are the current state, and the outputs include the next state, along with other outputs.

Figure 3:
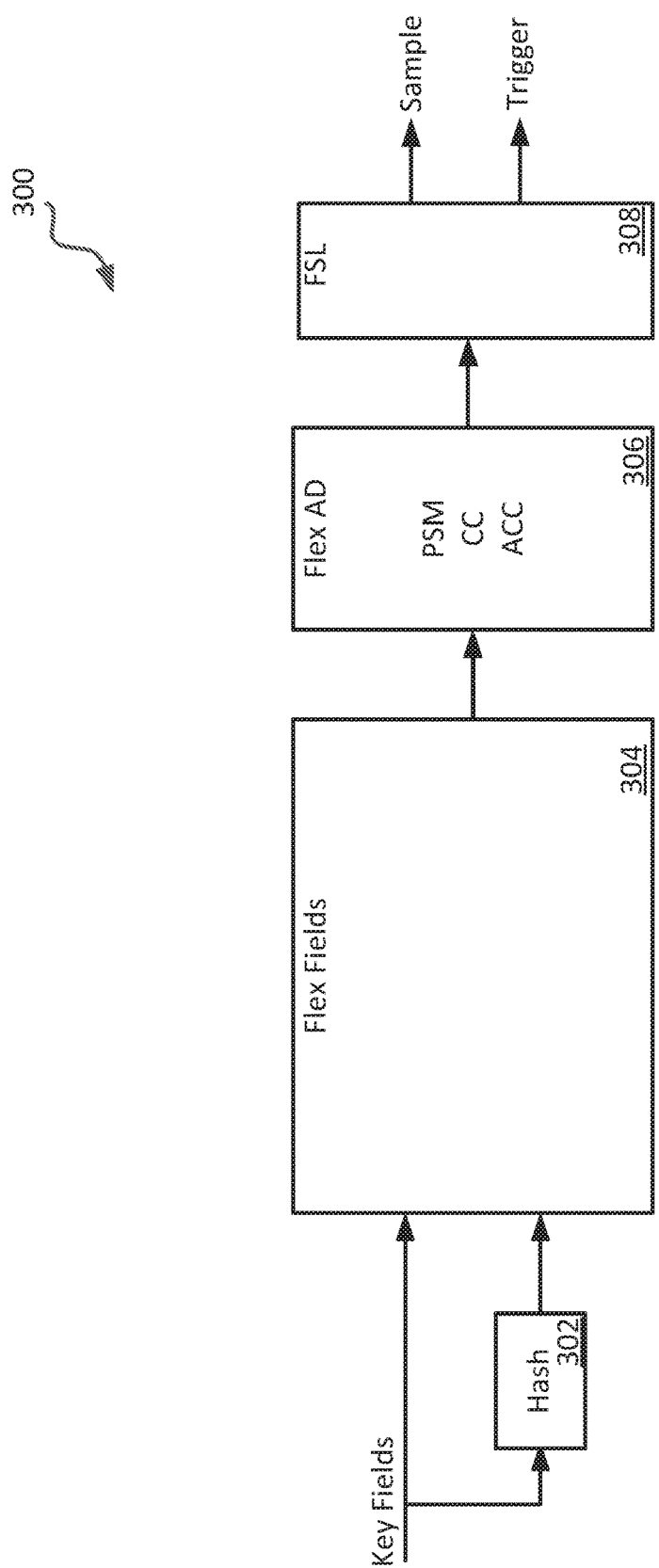
FIG. 3 illustrates a block diagram of an embodiment of a flexible flow table with programmable state machine (PSM) in accordance with the present disclosure.

FIG. 3 illustrates a block diagram of an embodiment of a flexible flow table with programmable state machine (PSM) 300 as a data flow analyzer. As per an embodiment of the present disclosure, a switch embedded programmable state machine allows for stateful trigger/data-collection to monitor data flows in, for example, a high speed data communication and switching systems. Non-limiting examples of states/triggers that may be of interest include, but are not limited thereto: state of a switch, who is connecting, how often and to whom, top talkers or talked to, specific packet sequences, packet drops, sequence of events, timing of packets (e.g., bursts of packets received/sent, aggregated number of packets, timing of specific packets relative to each other or another packet, proximity of specific packets in time, etc.), timing of specific triggers, when a counter of states exceeds a threshold, malware activated by non-standard TCP handshake, anomalous TCP flags, etc.

To monitor various states flexible flow table with programmable state machine (PSM) 300 detects and analyzes occurrences of key fields. Key fields of interest within the packets are selected, and when occurring in a packet flow, their occurrence is recorded (stored) over time in Flow State Hash Table 304. Flow State Hash Table therefore holds flow parameters from flows seen so far. Instead of fixed fields as may be commonly found in traditional flow monitors, flexible fields are only limited by a width of the field. Hash functions are primarily used in hash 302 to quickly locate a data record given its search key (the headword). Specifically, the hash function is used to map the search key to an index; the index gives the place in Flow State Hash Table 304 where the corresponding record should be stored.

Flex Associated Data Table 306 implements a programmable state machine where any combination of objects may be programmed as supported by the Flow State Hash Table 304 and flex switch logic (FSL 308), as will be discussed in greater detail below. Flex Associated Data Table 306 holds configured state table flow parameters and also the current state of a flow (e.g., as from Flex Switch Logic 308). Associated data (such as metadata) is stored therein in an index table and may be tied to an output from Flow State Hash Table 304.

Flex Associated Data Table 306 can also include one or more counters (e.g., with increment function implemented with a finite state language). A finite state language is a finite or infinite set of strings (sentences) of symbols (words) generated by a finite set of rules (the grammar), where each rule specifies the state of the system in which it can be applied, the symbol which is generated, and the state of the system after the rule is applied. The counters (or bank of counters) are typically conditional counters (CC) (e.g., this occurs, thus increment counter).

Flex Associated Data Table 306 (Flex AD) may also include, but is not limited to: time stamps, an accumulator (ACC), switch logic that can set individual bits in the meta-data based on flags, current state switch logic, state transition table and packet size distribution. State definitions may be defined, for example, by prior automatic control lists (ACL)) with entry creation and deletion supported by the state machine. ACLs are typically used to define packet filtering and forwarding rules for traffic traversing the switch.

Flexible Switch Logic (FSL) 308 includes an input, output, and various operations (e.g., add-subtract, etc.). The various operations can include computations. It is programmed to compute based on a current flow state and the inputs as stored within Flex Associated Data Table 306. It will generate potential actions to be taken as a sample for further analysis (e.g., when not sure of result) or as directly as a trigger on action busses (data busses) where further actions are taken (e.g., malware detection and resulting actions). Inputs can be defined as, but not limited to, bits (e.g., 80) selected from a {Fields, Objects, command} bus, metadata (e.g., 64 bits), state transition table actions, such as next state and/or actions to take. Outputs can be defined as, but not limited to, compressed input-to-state transition table, Associated data table write data, and update to {Objects, command} bus. Various equations or operations can be defined (programmed) into the FSL, such as, but not limited to: add, subtract, increment or decrement (e.g., a counter or accumulator may require 16 add/sub/inc (increment)/dec (decrement) operations), a comparator (e.g., length comparison with constant may require 32 16-bit comparators), a logical operation (e.g., random combinational logic may be required to set bits based on flags, any-bit-set, all-bits-set, etc.).

Figure 4:
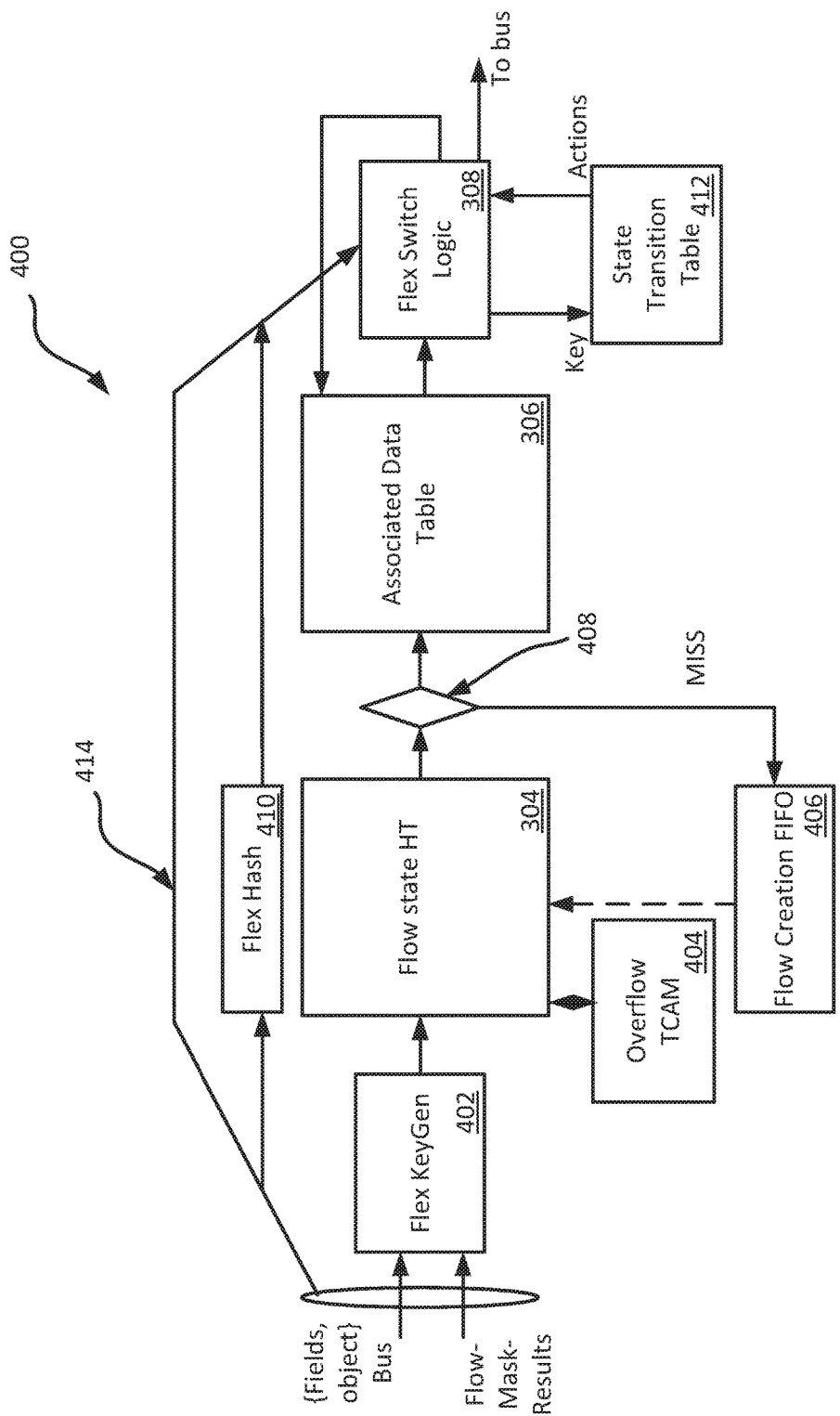
FIG. 4 illustrates an embodiment with a flexible flow table including a programmable state machine implemented with either table lookups and/or with flexible switch logic in accordance with the present disclosure.

FIG. 4 illustrates an embodiment with a flexible flow table 400 implemented with either table lookups or with flexible logic in accordance with the present disclosure. This embodiment includes using flexible logic blocks within FSL 308 and/or table memory within State Transition Table 412 to make a state machine fully programmable.

To monitor various states, key fields of interest within the packets are selected (programmed) by Flex Keygen (key generator) 402 and a key generated. The key presented by Flex Keygen 402 is searched for in the Flow State Hash Table 304. If a search for an entry in Flow State Hash Table 304 is successful (decision 408), this flow parameter is recorded and an index provided to Flex Associated Data Table 306. If a search for an entry in Flow State Hash Table 304 is unsuccessful (miss—decision 408), a note of this is made in Flow Creation FIFO (first-in, first-out) 406 so that this key can be added to Flow State Hash Table 304. Therefore, Flow State Hash Table 304 holds flow parameters from flows seen up to that point. Overflow TCAM (Ternary Content Addressable Memory) 404 allows a third matching state of "X" or "don't care" for one or more bits in stored data, thus adding flexibility to the search.

Flex Associated Data Table 306 holds configured state table flow parameters and also the current state of a flow (e.g., as from FSL 308 along with State Transition Table 412). Associated data (such as metadata) is stored therein in an index table and may be tied to an output from Flow State Hash Table 304 by using an index obtained from Flow State Hash Table 304 to access the data. Flex Associated Data Table 306 can be used to hold any combination of objects as supported by computations of the flex switch logic. Flex Associated Data Table 306 can also include one or more counters (e.g., with increment function implemented with a finite state language (FSL)). A finite state language (FSL) is a finite or infinite set of strings (sentences) of symbols (words) generated by a finite set of rules (the grammar), where each rule specifies the state of the system in which it can be applied, the symbol which is generated, and the state of the system after the rule is applied.

Flex Associated Data Table 306 (Flex AD) may also include, but is not limited to: time stamps, an accumulator, switch logic that can set individual bits in the meta-data based on flags, current state switch logic, state transition table and packet size distribution. State definitions may be defined, for example, by prior automatic control lists (ACL)) with entry creation and deletion supported by the state machine. ACLs are typically used to define packet filtering and forwarding rules for traffic traversing the switch.

Flexible Switch Logic (FSL) 308 includes an input, output, and various operations (e.g., add-subtract, etc.). The various operations can include computations. It is programmed to compute based on a current flow state and the inputs as stored within Flex Associated Data Table 306. It will generate actions that are sent out as a sample for further analysis (e.g., when not sure of result) or as a trigger on Action busses (data busses) where further actions are taken (e.g., malware detection and resulting actions). Inputs can be defined as, but not limited to, bits (e.g., 80) selected from a {Fields, Objects, command} bus, metadata (e.g., 64 bits), state transition table actions, such as next state and/or actions to take. Output can be defined as, but not limited to, compressed input-to-state transition table, Associated data table write data, and update to {Objects, command} bus. Various equations or operations can be defined (programmed) into the FSL, such as, but not limited to: add, subtract, increment or decrement (e.g., a counter or accumulator may require 16 add/sub/inc/dec operations), a comparator (e.g., length comparison with constant may require 32 16-bit comparators), a logical operation (e.g., random combinational logic may be required to set bits based on flags, any-bit-set, all-bits-set, etc.).

State Transition Table 412 retains encoding for current state, inputs and next state. It determines the next state along with the FSL Logic. The FSL can be alternatively be fed fields directly 414 by the input bus/flow-mask-results or an output from the Flex Hash 410. State Transition Table 412 receives a key from FSL 308 and returns actions. For example, to implement a port scan, a flow mask is set to IP with "dest_tcp_port" masked. Next, a hash input is set to "dest_tcp_port" and hash[5.0] to accumulate.

FIG. 5 illustrates the flexible flow table 400 of FIG. 4 in an IP (Internet protocol) 500 embodiment in accordance with the present disclosure. As shown, each packet goes through flow mask selection lookup in UAT1/VFP (unified adaptation table/VLAN (virtual local area network) based ingress pre-processor) 502. The lookup results in a flow mask, flow enable and can also identify an initial state. Flex Flow table (FFT) 400 is fed from UFT (unified forwarding table) 504 with flow mask selection and other associated data from flow mask lookup. The UFT determines forwarding of packets. FFT 400 can set fields in a command, object bus and target flexible counter bank 506. The flexible counter bank 506 counters can determine, for example, how many packets are received on a specific port or how many times an entry is received, etc.

An example use of the embodiments disclosed herein is mapped below for black hole detection to show how flexibility in computations and state keeping can help with implementing multiple requirements to the same machine. Another, non-limiting, example includes micro burst measurement.

In black hole detection, ports are configured as going UP or DOWN. A packet that is ingressed on an UP port and forwarded back to the UP port is classified as potential black hole. As a first step, an entry is created in the flow state table 400 with an associated timer. Next, packets are counted and when the count reaches a threshold, a copy of the packet is sent to the switch (sw). The associated flow table is configured to detect UP-to-UP forwarding and make a copy to ingress loopback with opcode=BLKHOLE. The associated flow table creates an entry with a destination prefix and stores the timer. Then, each subsequent packet increments a count. When a count exceeds a threshold and a timer value is less than configured, copy state to CPU (central processing unit) for recordation (in memory) and further analysis or action.

In another example, micro-bursts can be detected by: setting the state machine with a timer, counting if "time<InterPacketBurstTime" and thereafter detecting when "time>InterPacketBurstTime".

One or more benefits of the present disclosure include, but are not limited to, large data flow analysis, visibility into applications or the network, detection of hotspots, troubleshooting, anomaly detection and data mining. In addition, the built-in flexibility also allows costs to be amortized over multiple functions.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, processing times, and/or accuracy. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module). As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items provides a desired relationship. For example, when the desired relationship is that a measurement metric 1 has a greater magnitude than measurement metric 2, a favorable comparison may be achieved when the magnitude of a measurement metric value 1 is greater than that of signal 2 or when the magnitude of a measurement metric value 2 is less than that of signal 1.

As may also be used herein, the terms "processing module", "processing circuit", "processor", "CPU" and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A network switch for network communications, the network switch comprises:
   a first data bus, the first data bus supporting receiving first data;
   a second data bus, the second data bus supporting transmitting second data;
   a data flow analyzer, the data flow analyzer coupled between the first data bus and the second data bus and including at least:
      a first table configured to detect selectable data packet fields within a data flow;
      a second table including a programmable state machine, the second table coupled to an output of the first table and configured to retain selectable states of one or more instances of the detected selectable data packet fields;
      programmable switch logic configured to output one or more potential actions to be taken based on a selectable computation of the detected selectable data packet fields;
      a third table coupled to the programmable switch logic and including encoding for a current state of the selectable states and next state transitions; and
   wherein the data flow analyzer communicates with the first data bus to receive and analyze the selectable data packet fields, compute a programmable state and potential actions, and communicate the one or more potential actions to the second data bus.

2. The network switch of claim 1, wherein the first table retains a flow state of the selectable data packet fields.

3. The network switch of claim 1, wherein the programmable state machine is embedded within circuitry of the network switch.

4. The network switch of claim 1 further comprises a key generator outputting a key representing the selectable packet fields to be searched within the first table.

5. The network switch of claim 1, wherein the third table further determines the next state transitions in conjunction with the programmable switch logic.

6. The network switch of claim 1 further comprises a flow creation memory to track when no detection of the selectable data packet fields within the first table occurs.

7. The network switch of claim 6, wherein the flow creation memory is further configured to add a key to the first table for the selectable data packet fields when the no detection of the selectable data packet fields within the first table occurs.

8. The network switch of claim 1, wherein the second table further comprises one or more conditional counters to count occurrences of one or more of the selectable data packet fields or the programmable states.

9. The network switch of claim 8, wherein the second table further comprises one or more accumulators to accumulate outputs of the one or more conditional counters.

10. The network switch of claim 1, wherein the programmable switch logic performs one or more of: addition, subtraction, incrementing or decrementing, comparing, or a logical operation.

11. The network switch of claim 1, wherein the one or more potential actions to be taken include either a trigger for an action to be taken or a sample of the potential action for further analysis before taking an action.

12. The network switch of claim 1, wherein the data flow analyzer is configured to detect within a data flow, one or more of: specific connections between two or more network addresses, frequency of connections between the two or more network addresses, timing of the connections between the two or more network addresses, a number of occurrences of the connections between the two or more network addresses, anomalies within the data flow, microbursts, black holes, or malware.

13. A network switch for network communications, the network switch comprising:
   a first data bus, the first data bus supporting receiving data packets;
   a second data bus, the second data bus supporting transmitting data; and
   an embedded data flow analyzer, the embedded data flow analyzer coupled between the first data bus and the second data bus and including:
      a selectable key generator to generate a search key of selectable data packet fields;
      a flow state table configured to receive the search key, look up the key, and record detection of a state of the selectable data packet fields;
      an associated data table, the associated data table including a programmable state machine configured to detect selectable states of one or more instances of the state of the selectable data packet fields;
      programmable switch logic configured to compute potential actions based on a current state of the programmable state machine and the one or more instances of the state of the selectable data packet fields;

a transition table coupled to the programmable switch logic and including encoding for current state and next state transitions of the programmable state machine: and wherein the embedded data flow analyzer communicates with the first data bus to receive and analyze the selectable data packet fields and further communicates the potential actions to the second data bus.

14. The network switch of claim 13, wherein the transition table is configured to further determine the next state transitions in conjunction with the programmable switch logic.

15. The network switch of claim 13 further comprises a flow creation memory to track when no detection of the key representing the selectable data packet fields within the flow table occurs.

16. The network switch of claim 13, wherein the programmable switch logic performs one or more of: addition, subtraction, incrementing or decrementing, comparing, or a logical operation.

17. The network switch of claim 13, wherein the associated data table further comprises one or more conditional counters to count occurrences of one or more of the selectable data packet fields or the programmable states.

18. A network switch for network communications, the network switch comprising:
   a first data bus, the first data bus supporting receiving data packets;
   a second data bus, the second data bus supporting transmitting data; and
   an embedded data flow analyzer, the embedded data flow analyzer coupled between the first data bus and the second data bus and including:
      a selectable key generator to generate a search key of selectable data packet fields;
      a flow state table configured to receive the search key and record detection of the selectable data packet fields;
      an associated data table, the associated data table including a programmable state machine configured to detect selectable states of one or more instances of the detected selectable data packet fields;
      programmable switch logic configured to compute potential actions based on a current state of the programmable state machine and the one or more instances of the detected selectable data packet fields;
      a transition table coupled to the programmable switch logic and including encoding for a current state of the selectable states and next state transitions of the programmable state machine; and
   wherein the embedded data flow analyzer communicates with the first data packet bus to receive and analyze the selectable data packet fields and further communicates the potential actions to the second data bus, and
   wherein a sample of one or more of the potential actions is output for further analysis to the second bus before taking a corresponding action.

* * * * *